US012411095B2

(12) United States Patent
Kladt et al.

(10) Patent No.: US 12,411,095 B2
(45) Date of Patent: Sep. 9, 2025

(54) SYSTEM AND METHOD FOR ASSESSING A COATED SURFACE WITH RESPECT TO SURFACE DEFECTS

(71) Applicant: BYK-Chemie GmbH, Wesel (DE)

(72) Inventors: Nikolay Kladt, Bonn (DE); Jörg Hinnerwisch, Duisburg (DE); Brigitte Dicke, Arnsberg (DE); Christopher Groh, Wolfratshausen (DE); Manfred Knospe, Rees (DE); Volker Thyssen-Wallner, Goch (DE); Petra Della Valentina, Dinslaken (DE)

(73) Assignee: BYK-CHEMIE GMBH, Wesel (DE)

( * ) Notice: Subject to any disclaimer, the term of this patent is extended or adjusted under 35 U.S.C. 154(b) by 323 days.

(21) Appl. No.: 18/019,623

(22) PCT Filed: Aug. 2, 2021

(86) PCT No.: PCT/EP2021/071577
§ 371 (c)(1),
(2) Date: Feb. 3, 2023

(87) PCT Pub. No.: WO2022/029082
PCT Pub. Date: Feb. 10, 2022

(65) Prior Publication Data
US 2023/0304941 A1 Sep. 28, 2023

(30) Foreign Application Priority Data
Aug. 5, 2020 (EP) .................................... 20189678

(51) Int. Cl.
*G01N 21/88* (2006.01)
(52) U.S. Cl.
CPC . *G01N 21/8851* (2013.01); *G01N 2021/8854* (2013.01); *G01N 2021/8887* (2013.01)

(58) Field of Classification Search
CPC ....... G01N 21/8851; G01N 2021/8854; G01N 2021/8887; G06T 2207/10004;
(Continued)

(56) References Cited

U.S. PATENT DOCUMENTS 6,166,366 A  12/2000  Lewis
9,208,394 B2 * 12/2015  Di Venuto Dayer ....................... G07D 7/2033
(Continued)

FOREIGN PATENT DOCUMENTS

CA     3217303 A1 * 11/2022 ............. B22F 10/85
CN   104508423 B    6/2018
(Continued)

OTHER PUBLICATIONS

Taherimakhsousi et al. "Quantifying Defects in Thin Films using Machine Vision", 2020; downlable from https://arxiv.org/abs/2003.04860. (Year: 2020).*
(Continued)

*Primary Examiner* — Mohamed K Amara

(57) ABSTRACT

The invention relates to a method for providing a system for assessing a coated surface with respect to a type set containing at least one type of surface defect that can occur on the surface, to such a system for assessing a coated surface, to a measuring device for acquiring an image of a coated surface including such a system, and to a method for assessing a coated surface using such a system. The system can use a convolutional neural network (CNN), in particular the so-called U-Net architecture, to recognize the at least one surface defect in an image provided to the system. Moreover, the system can use a support vector machine algorithm to provide, based on the recognition results, quantitative and/or qualitative information about the depiction of the at least one surface defect in the image provided to the system.

20 Claims, 4 Drawing Sheets

(58) Field of Classification Search
CPC . G06T 2207/10028; G06T 2207/20081; G06T 2207/20084; G06T 2207/30136; G06T 2207/30156; G06T 2207/30161; G06T 7/0004

See application file for complete search history.

(56) References Cited

U.S. PATENT DOCUMENTS

| | | | | |
|---|---|---|---|---|
| 12,205,294 | B2 * | 1/2025 | Pizzocchero | G06V 30/1448 |
| 12,243,370 | B2 * | 3/2025 | Di Venuto Dayer, V | G06V 10/242 |
| 2003/0076989 | A1 * | 4/2003 | Maayah | G06T 7/0004 382/145 |
| 2007/0089625 | A1 | 4/2007 | Grinberg | |
| 2017/0132465 | A1 * | 5/2017 | Kutter | G06T 7/0004 |
| 2020/0160497 | A1 * | 5/2020 | Shah | G06T 7/13 |
| 2022/0143704 | A1 * | 5/2022 | Tran | B23K 26/082 |
| 2022/0152935 | A1 * | 5/2022 | Ba | B22F 10/38 |
| 2023/0076556 | A1 * | 3/2023 | Goyal | B29C 64/188 |
| 2023/0390824 | A1 * | 12/2023 | Chandelle | B22F 10/85 |
| 2024/0005472 | A1 * | 1/2024 | Kopylov | G06T 7/0012 |

FOREIGN PATENT DOCUMENTS

| | | | | |
|---|---|---|---|---|
| CN | 110297401 | A * | 10/2019 | G01N 21/95 |
| CN | 111325713 | A | 6/2020 | |
| CN | 115457476 | A * | 12/2022 | G06V 20/52 |
| CN | 116879299 | A * | 10/2023 | G01N 21/88 |
| DE | 102010047499 | | 10/2011 | |
| JP | 5176142 | B2 | 4/2013 | |
| JP | 7084964 | B2 * | 6/2022 | G06N 3/045 |
| WO | 2018154562 | | 8/2018 | |
| WO | WO-2020093042 | A1 * | 5/2020 | G06N 3/04 |
| WO | WO-2020106725 | A1 * | 5/2020 | G06N 20/00 |

OTHER PUBLICATIONS

Makantatis et al. "Deep Convolutional Neural Networks for Efficient Vision Based Tunnel Inspection", 2015; IEEE International Conference on Intelligent Computer Communication and Processing (ICCP) (2015, pp. 335-342). (Year: 2015).*
Perez et al. "Deep Learning for Detecting Building Defects Using Convolutional Neural Networks"; Sensors 2019, 19, 3556. (Year: 2019).*
International Search Report and Written Opinion for International Application No. PCT/EP2021/071577 dated Nov. 12, 2021.
Notification of Transmittal of the International Preliminary Report on Patentability for International Application No. PCT/EP2021/071577 dated Oct. 31, 2022.
O. Ronneberger et al., "U-Net: Convolutional Networks for Biomedical Image Segmentation," May 18, 2015, pp. 1-8.
X. Tao et al., Applied Sciences, "Automatic Metallic Surface Defect Detection and Recognition with Convoluntional Neural Networks," 2018, 8, 1575, pp. 1-15.
Y. He et al., IEEE Transactions on Instrumentation and Measurement, vol. 69, No. 4, Apr. 2020, pp. 1493-1504.
Z. Liu et al., IEEE Transactions on Instrumentation and Measurement, vol. 69, No. 2, Dec. 2020, pp. 9681-9694.

* cited by examiner

SYSTEM AND METHOD FOR ASSESSING A COATED SURFACE WITH RESPECT TO SURFACE DEFECTS

The invention relates to a method for providing a system for assessing a coated surface with respect to a type set containing at least one type of surface defect that can occur on the surface, to such a system for assessing a coated surface, to a measuring device for acquiring an image of a coated surface including such a system, and to a method for assessing a coated surface using such a system.

Xian Tao et al "Automatic Metallic Surface Defect Detection and Recognition with Convolutional Neural Networks", Applied Sciences, 6 Sep. 2018, page 1575, relates to the automatic detection of defects in metallic surfaces, such as scratches, glue marks, dust, and damages.

HE YU et al "An End-to-End Steel Surface Defect Detection Approach via Fusing Multiple Hierarchical Features", IEEE Transactions on Instrumentation and Measurement, IEEE service Center, Piscataway, NJ, US, Vol. 69, No. 4, 7 May 2019, pages 1493-1504, relates to an automated method for steel plate defect inspection.

LIU ZHENYU et al "Visual Defect Inspection of metal Part Surface via Deformable Convolution and Concatenate Feature Pyramid Neural Networks", IEEE Transactions on Instrumentation and Measurement, IEEE service Center, Piscataway, NJ, US, Vol. 69, No. 12, 11 Jun. 2020, pages 9681-9694, relates to a surface defect inspection for metal parts. A deep learning method based on the deformable convolution and concatenate feature pyramid neural network is proposed.

CN 111325713 A belongs to the field of image processing technology, and specifically relates a method, system, and storage medium for detecting wood defects, based on neural networks.

A coated surface in the sense of the invention can, for instance, be a surface painted with a liquid paint or coated with a powder coating.

There are, however, no specific limitations with respect to the type of surface coating to be assessed by the method of the invention. Examples of suitable coating formulations include coatings hardening by physical drying, i.e. by evaporation of a volatile organic solvent and/or water, as well as coatings curing by a chemical curing or crosslinking reaction. Curing may occur at ambient temperature or at elevated temperature, for example in a curing oven. Alternatively, curing may be initiated by UV radiation. Furthermore, the coatings may be heat cured powder coatings. The coatings can be pigmented opaque coatings or non-pigmented clear coatings. The coating formulations generally comprise a polymeric film-forming binder. Exemplary polymer types suitable as binder include polyesters, polyacrylates, alkyd resins, polysiloxanes, polyurethanes, polyethers, and epoxide resins. Chemically curing coating formulations generally comprise a crosslinker having crosslinking functional groups. Examples of crosslinking functional groups are amine groups, isocyanate groups, carboxylic anhydride groups, and etherified amino groups.

Generally, the coated surface is assessed after the applied coating has been cured or hardened. However, if desired, certain surface defects can also be assessed on coatings after their application, but before they have been cured. UV-curable formulations suitably comprise monomers and/or polymers having ethylenically unsaturated polymerizable groups.

Materials to be coated include wood, metal, and plastic, which can also be pre-coated, for example by a primer. A coated surface can also, for instance, be a surface coated by sputtering or electroplating.

The coated surfaces to be assessed may be assigned various usage scenarios, for example coatings for transportation vehicles, such as automobiles, trucks, airplanes, coatings for exterior or interior wood protection and wood decoration, for example coatings for furniture, floors, window frames, or doors, coatings for plastic, coatings for interior home decoration for walls and appliances, metal coatings and coil coatings, general industrial coatings, protective coatings, for examples coatings for ships, bridges, buildings or parts thereof, toys, domestic appliances, electronic devices etc. The coatings are generally applied to the surface by techniques corresponding to the usage scenario, for example by spraying, brushing, rolling, dipping or drawing.

A coating surface defect in the sense of the invention is a deviation from a homogeneous coating in a certain partial area of the coated surface. A coating surface defect can also be described as a partial area of the coated surface in which the coating exhibits a generally undesired structure, where the structure of the surface can be undesired for instance for technical, economic, aesthetic, or other reasons.

A technical reason might be that the defective surface area will not be as resistant against abrasion or corrosion or as water-proof or weather-proof as desired. An economic reason might be that more coating material than necessary will be needed for the defective surface area during the coating process. An aesthetic reason might be that the defective surface area will not look as even or smooth as desired or will not reflect incident light in the desired way.

TECHNICAL FIELD

The invention is in the field of quality control for coated surfaces as defined above based on imaging methods, and, more specifically, in the field of detection and quantification of physical surface defects of different types on such coated surfaces.

BACKGROUND OF THE INVENTION

The use of imaging systems for the manual quality control of coated surfaces is common and usually quantifies surface properties to correspond to the overall impression of a human observer. This quantification process is typically highly specific to the application domain (e. g. to metallic coatings in the automotive industries).

Currently, either coated specimens themselves or digital (microscopy) images thereof are used to manually assess the quality and nature of topological defects of a coated surface. In addition, few standards exist to quantitatively compare topologies of different samples. Therefore, the results of such an assessment may depend on the individual expert opinion and environmental context (e. g. physical lighting or designated application). For example, different types of surface defects might be solely considered, or their impact on the final assessment might differ.

As such, it is difficult to assess large numbers of samples of coated surfaces and compare topology assessments across usage scenarios. Automated surface quality assurance measures are known, yet these methods do not distinguish or assign types of defects. For example, such quality control systems operate on the principle to measure the (total) deviation from a defined surface height profile. In case the threshold exceeds a certain benchmark, samples are indicated as failed (defective surface). However, such automated methods do not characterize the nature of the topological surface defect, therefore limiting a root-cause correlation (e. g. a correlation with the formulation of the coating or with the application technique).

Thus, while automated systems for the image acquisition and quantitative generation of painted surface properties exist, the evaluation process commonly involves manual work or an automated comparison of the quantitative features against references and fixed tolerance criteria, requiring human expertise to fine-tune tolerance criteria based on the quantitative features obtained.

Therefore, there is a need for further automating the assessment of coated surfaces with respect to surface defects.

Such an automated system could, for example, be integrated into an automated high-throughput experimentation (HTE) environment, in particular for developing and optimizing formulations for such coatings. In such an HTE environment, many parameters of the formulation of the coating, the application technique, and the curing scheme can then be varied, and the results of such variations on the occurrence of surface defects on the coated surface can be detected and assessed in an automated, reproducible, and quantitative way for a multitude of patterns.

Moreover, an automated system for assessing coated surfaces with respect to surface defects can also be integrated into a production line for coated products, e. g. a paint line in a car production plant. In this application, the system for assessing coated surfaces can support the quality control facilities at the end of the production line by issuing a "fail/pass" statement for the coated products leaving the production line.

Therefore, the problem underlying the present invention is to provide an automated system for the assessment of coated surfaces with respect to surface defects.

This problem is solved by a method for providing a system for assessing a coated surface according to claim 1, such a system for assessing a coated surface according to claim 8, a measuring device for acquiring an image of a coated surface according to claim 9, which includes such a system, and a method for assessing a coated surface according to claim 10, which uses such a system. Further advantageous embodiments of the invention are the subject-matter of the subclaims.

In a first aspect, the invention relates to a method for providing a system for assessing a coated surface with respect to a type set containing at least one type of coating surface defect that can occur on the coating surface, wherein the type set contains at least one of the types pinhole, blister, crater and seed, and wherein the system contains a database and at least one machine learning algorithm;

The method includes the steps of:
generating a plurality of images of coated surfaces;
wherein at least one of the images is a three-dimensional image including topography information of the coated surface,
generating a plurality of datasets each containing at least one of the images of coated surfaces, wherein each dataset for which the at least one image contained therein depicts at least one surface defect having a type from the type set is labeled with this at least one type and/or with quantitative and/or qualitative information about the depiction of this at least one surface defect in the at least one image,
storing the plurality of datasets in the database,
using a plurality of datasets in the database to train the at least one machine learning algorithm to recognize at least one surface defect having a type from the type set in an image provided to the system and/or to provide quantitative and/or qualitative information about the depiction of the at least one surface defect in the image.

In the context of the invention, the term "database" is used in the usual technical sense in the field of computer science, i. e. an organized collection of data or, in other words, a system in which a large number of data items can be stored. In the present context, the data items that can be stored in the database are called "datasets".

Moreover, the term "machine learning algorithm" is used in the sense of an algorithm that improves automatically through experience in the form of sample data or training data, in order to make predictions or decisions without being explicitly programmed to do so. In particular, a machine learning algorithm can be a so-called "deep learning algorithm", which is based on artificial neural networks with representation learning.

The term "quantitative and/or qualitative information about the depiction of a surface defect in an image" is used for any information linked to a depiction of the surface defect, in particular to a human impression of the depiction.

The invention combines a system for quantitative image acquisition with a machine learning algorithm, in particular a deep learning algorithm, that enables a semantic representation and quantification of different types of surface defects and is capable of linking those to application specific human impression scales.

Thus, the invention enables the assessment of the overall topology quality of coated surfaces by characterizing the coating surface defects by type and quantity. Based on such characterization and quantitative analysis, determination of coating surface defects of large sample populations can be automated in an objective manner. As such, the surface topology quality of a large number of specimens can be graded. In addition, this may provide a diagnostic tool to correlate and predict surface defects with the coating formulation.

More specifically, the invention can be used in two broad ways: First, the quantitative evaluation of a coating surface assists an expert in the qualitative evaluation, possibly using reference samples. And second, the invention provides the qualitative assessment based on existing data and usage scenarios.

Finally, the results obtained by the invention can be associated with one or more additional parameters of the coated surface, for example layer thickness of the coating, application technique of the coating, or compositional parameters of the coating composition. In some embodiments, other visual coating properties, such as color or gloss, may be determined and taken into account for characterization of the coating surface quality as well.

Deep learning based approaches have been tremendously successful in computer vision applications (e. g. facial recognition, object detection), even exceeding human performance levels. However, they are highly specialized systems, particularly tuned to a certain set of tasks and intricately linked to the type of image acquisition used in the respective context. Furthermore, firstly, they typically require large amounts of labelled data for training and, secondly, they are susceptible to changes in image quality. For example, it has been shown that they are susceptible to adversarial samples.

While the invention, as described in detail below, shows a general approach to addressing the use cases, it is, in some embodiments, strongly linked to the nature and type of image acquisition, preprocessing of images, and/or configuration of the deep learning algorithm used for the semantic classification and subsequent quantification.

In a preferred embodiment of the first aspect of the invention, at least one of the images of coated surfaces is a three-dimensional image including topography information of the coated surface.

Whereas two-dimensional images are more efficient in terms of storage size and processing speed, three-dimensional images including topography information can provide more details about the shape of the coating surface defects to be detected and categorized to the machine learning algorithm.

In a further preferred embodiment of the first aspect of the invention, the step of generating a single image of a coated surface comprises one or more of the substeps of image acquisition, surface sampling, and image processing. In this way, high quality and, at the same time, standardized images, even of large surfaces, can be obtained.

The type set contains at least one of the types pinhole, blister, crater, and seed. These types of surface defects, which are of interest in the assessment of many different coated surfaces, can be defined in the following way:
  pinholes are pore-like penetrations in the coating;
  blisters are broken or unbroken bubbles under or within the coating;
  craters are small bowl-shaped depressions in the coating;
  seeds are grain-shaped protrusions of the coating, possibly caused by solid particulates trapped under the coating.

Apart from the types of coating surface defects themselves, also coating surface characteristics resulting from these defects can be considered, such as coating surface roughness.

In a further preferred embodiment of the first aspect of the invention, the system contains a first machine learning algorithm, which uses a convolutional neural network to recognize the at least one surface defect having a type from the type set in the image provided to the system.

A convolutional neural network, used here in the usual sense in the field of artificial neural networks, is a neural network that consists of an input and an output layer, as well as multiple hidden layers, and which uses a certain mathematical operator, namely convolution, in place of general matrix multiplication in at least one of its layers.

In a preferred variant of this embodiment, the first machine learning algorithm uses the U-Net architecture.

The term "U-Net architecture" denotes a type of convolutional neural network architecture originally proposed by Ronneberger et al. for biomedical image segmentation (O. Ronneberger, Ph. Fischer, T. Brox (2015), *U-Net: Convolutional Networks for Biomedical Image Segmentation*, available at https://arxiv.org/abs/1505.04597).

Surprisingly, this architecture—although designed for completely different applications, namely for biomedical image segmentation tasks—turned out to work very well also in the present context of the assessment of coated surfaces with respect to coating surface defects.

In a further preferred embodiment of the first aspect of the invention, the system contains a second machine learning algorithm, which uses a support vector machine algorithm to provide, based on the recognition result of the first machine learning algorithm, the quantitative and/or qualitative information about the depiction of the at least one surface defect in the image provided to the system.

Here, the term "support-vector machine algorithm" has the common technical meaning as used in computer science, i. e. a supervised learning model with an associated learning algorithm that analyzes data used for classification and regression analysis.

The advantage of a two-step approach using a first and a second machine learning algorithm, as deployed in this embodiment, is interpretability, more specifically the possibility to explicitly obtain the most important intermediate result, namely the recognition result with respect to the type of surface defect, and thus being able to understand why the system outputs the final result, namely the quantitative and/or qualitative information.

As already mentioned above, the quantitative and/or qualitative information about the depiction of a coating surface defect in an image can be information linked to a human impression of the depiction of the surface defect. Such a human impression could be, for example, an informal textual description of the impression and thus a piece of qualitative information.

In a further preferred embodiment of the first aspect of the invention, however, this information is a human impression metric. Such a human impression metric might be, for example, a rating of the severity of the coating surface defect on a scale from 1 ("insignificantly severe") to 10 ("most severe"). In this case, the information is rather of a quantitative than of a qualitative kind. By providing the human impression metric by the system itself, the task of assessing the coated surface, which was previously performed by a human, can be automated.

In a further preferred embodiment of the first aspect of the invention, which is an alternative to the two-step approach using a first and a second machine learning algorithm as described above, the system contains a third machine learning algorithm, which uses a convolutional neural network with several layers to provide the quantitative and/or qualitative information about the depiction of the at least one surface defect in the image provided to the system, without having separately recognized the at least one surface defect in the image before.

In this way, the quantitative and/or qualitative information can be derived directly from the given image by using a single machine learning algorithm, instead of using two separate machine learning algorithms for different sub-tasks as above, which simplifies the architecture of the system.

In a second aspect, the invention relates to a system for assessing a coated surface with respect to a type set containing at least one type of coating surface defect that can occur on the coating surface, as provided by the method according to the first aspect of the invention. Thus, the features and advantages of the system can be derived from the above description of the method for providing the system.

In a third aspect, the invention relates to a measuring device for acquiring an image of a coated surface including a system according to the second aspect of the invention. The features and advantages of the measuring device, as far as the system for assessing a coated surface is concerned, can also be derived from the above description of the method for providing the system.

The measuring device itself can be a surface measuring device which is capable of measuring surface parameters like color, brightness, gloss, etc., and/or of measuring the height profile of the surface. The measuring device can, for example, be a surface measuring device by BYKGardner®, e. g. from its "spectro2profiler" product line.

The advantage of the measuring device according to the third aspect of the invention is that the user only needs to operate a single device, in which the system for assessing the coated surface is integrated. The results of the assessment of the surface may be displayed directly in a display of the measuring device and/or may be transmitted to a device outside the measuring device like a stationary computer or server with storage capabilities for these results.

In a fourth aspect, the invention relates to a method for assessing a coated surface with respect to a type set containing at least one type of surface defect that can occur on the surface. The method includes the steps of:
- providing a system for assessing a coated surface according to the second aspect of the invention,
- generating an image of a coated surface and providing the image to the system, wherein at least one of the images is a three-dimensional image including topography information of the coated surface,
- using the at least one trained machine learning algorithm of the system to assess the coated surface depicted in the image by outputting a statement that the image of the coated surface depicts at least one coating surface defect having a type from the type set together with this type, and/or outputting quantitative and/or qualitative information about the depiction of the at least one coating surface defect in the image.

Thus, the method according to the fourth aspect consists in the deployment of the system according to the second aspect for the actual assessment task. The features and advantages of this method can also be derived from the above description of the method for providing the system.

Moreover, in a preferred embodiment of the fourth aspect of the invention, the step of generating an image of a coated surface uses the same substeps as in the step of generating an image of a coated surface used in generating the plurality of datasets in the database of the system for assessing a coated surface.

In this way, it is guaranteed that the images both for training the machine learning algorithms and for the actual assessment task have a high degree of formal correspondence, which leads to a higher accuracy of the recognition results.

Further advantageous embodiments of the invention are described in the following description in connection with the attached drawings.

Figure 1:
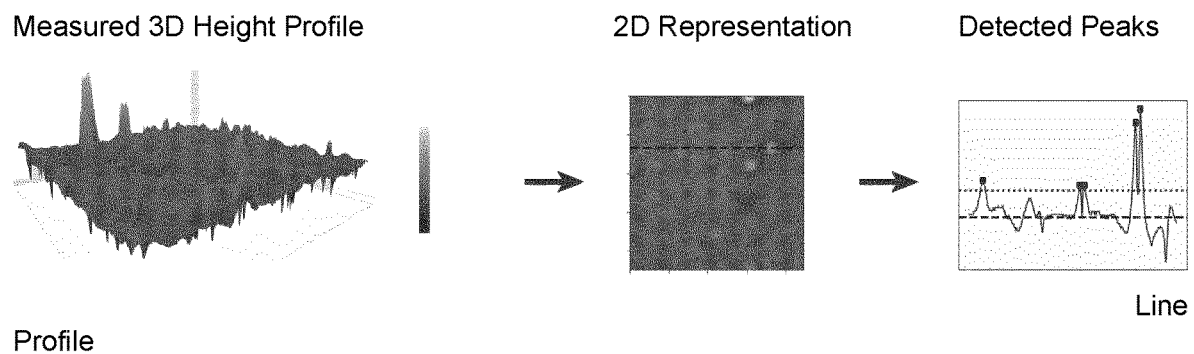
FIG. 1 shows an exemplary representation of a method for assessing a coated surface according to the prior art.

FIG. 1 shows an exemplary representation of a method for assessing a coated surface according to the prior art. In this method, the coated surface to be assessed is scanned by a 3D portal scanner (not shown), whereby not only color and brightness information, but also height information for each pixel scanned is obtained. From the data obtained by the 3D scanner, a three-dimensional image of the coated surface is obtained (first picture). For a certain partial area of the coated surface, a height profile of a cross-section is calculated from the image (second picture).

This height profile is then analyzed by statistical methods like the determination of the maximum peak value and the average value (third picture). From this analysis, statistical parameters can then be derived which are representative of certain surface defects (not shown).

Figure 2:
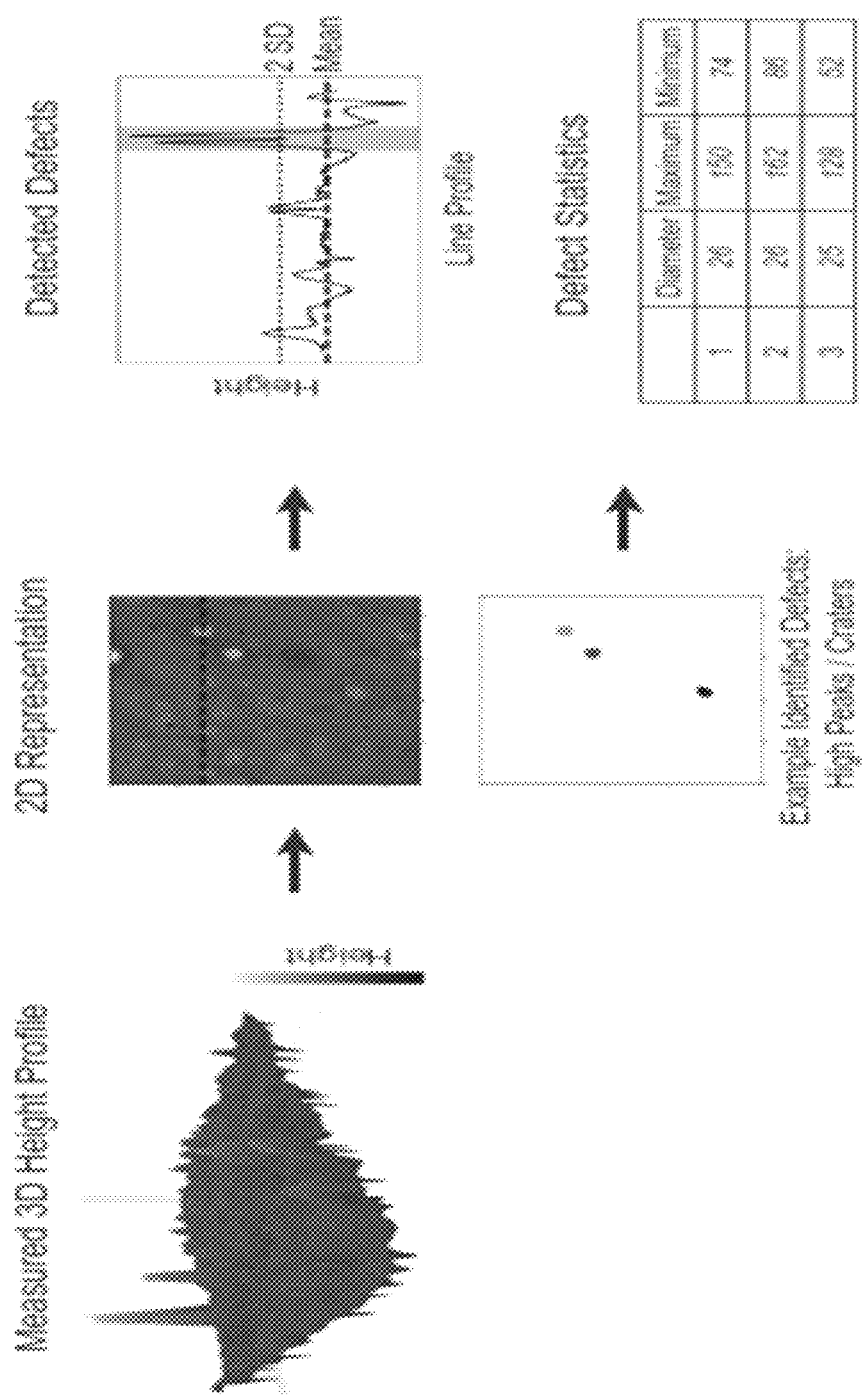
FIG. 2 shows an exemplary representation of the method for assessing a coated surface according to the fourth aspect of the invention.

FIG. 2 shows an exemplary representation of a method for assessing a coated surface according to the fourth aspect of the invention. In this method, the coated surface to be assessed is scanned by a specialized surface measuring device (not shown).

The system for assessing a coated surface according to the second aspect of the invention can be included in the surface measuring device, in which case the surface measuring device is a measuring device according to the third aspect of the invention, or it can be installed on a separate computer, in a computer network, or even in the so-called "cloud". The decision whether to include the system for assessing a coated surface in the surface measuring device itself depends on parameters of the surface measuring device like its form factor, its computing power, its battery capacity, etc.

A further alternative for the arrangement of the system for assessing a coated surface with respect to the surface measuring device is a "distributed arrangement". This means that the training of the one or more machine learning algorithms is performed offline, i. e. in a computer or computer network outside the coating surface measuring device, the trained system is then transferred to the surface measuring device as software and/or hardware, and the assessment of the coated surface measured is performed online, i. e. within the coating surface measuring device itself, in particular in an autonomous way, i. e. without any connection to a computer outside the surface measuring device.

This process of offline training and online use is sometimes described in the way that the surface measuring device is "pinned" for a certain application domain or customer.

From the data obtained by the measuring device, a three-dimensional image of the coated surface is obtained as above (first picture). Furthermore, a two-dimensional image including topographical information represented by different colors and/or gray scale values is obtained (second picture, above). Also, for a certain partial area of the coated surface, a height profile of a cross-section is calculated from the image (third picture, right).

This height profile is then analyzed for detecting certain surface defects like pinholes, craters, or bubbles (blisters) using a machine learning algorithm which has been trained before with images of similar surface defects (fourth image). A final result of the assessment is a list of the different types of surface defects to be detected together with the number of occurrences of each of these types of surface defects on the analyzed coated surface (Defect Statistics).

Figure 3:
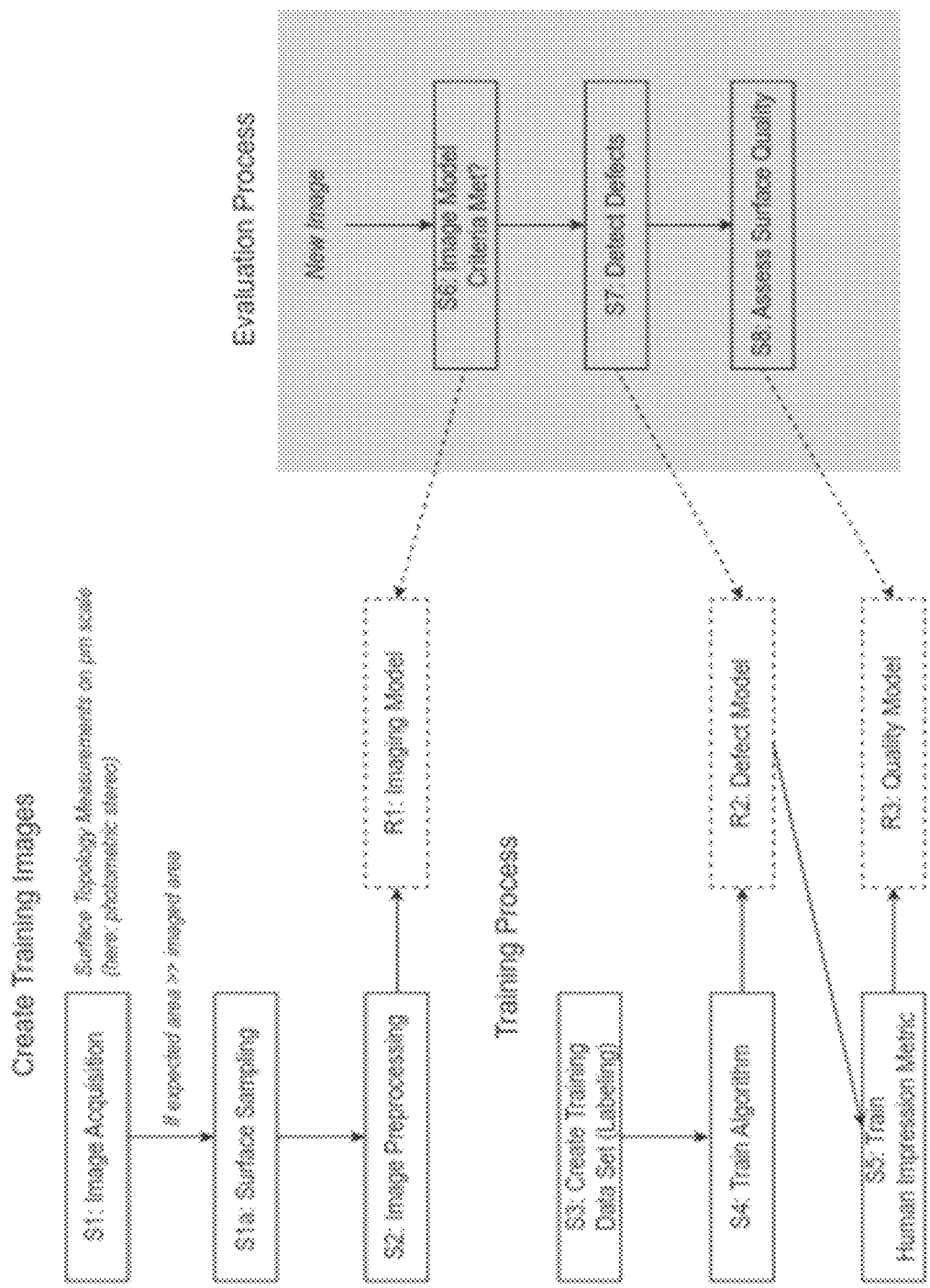
FIG. 3 shows a block diagram of an implementation of the method for providing a system for assessing a coated surface according to the first aspect of the invention and of the method for assessing a coated surface according to the fourth aspect of the invention.

FIG. 3 shows a block diagram of an implementation of the method for providing a system for assessing a coated surface according to the first aspect of the invention and of the method for assessing a coated surface according to the fourth aspect of the invention.

Both methods use the same image generation steps S1, S1*a*, and S2, optionally leading to Imaging Model R1. The method for providing the system (left branch, "Training") additionally includes steps S3 and S4, leading to Defect Model R2, an S5, leading to Quality Model R3. The method for assessing a coated surface (right branch, "Evaluation Process") additionally includes steps S6, S7, and S8. All these steps and models are explained in detail in the following.

The invention enables a semantic classification and quantification of different defect types observed when the quality of a surface varnish or coating is characterized. In the specific embodiment described here, two different types of defects are distinguished: pinholes and blisters. However, the method described is not limited to these defect types. Given suitable training samples, this can be extended to cover further defect types such as craters or seeds. These defects are in the lateral and vertical size range of μm to mm. Therefore, high quality image acquisition is a crucial prerequisite for the use-cases described here, and the exact configuration depends on the type of image acquisition used.

Image Acquisition (Step S1)

As an image acquisition device, the "spectro2profiler" device developed by BYK-Gardner® is used. Using photometric stereo, the height profile of a given area can be measured with a spatial resolution of 30 μm/pixel, an imaging area of 225 mm², and a vertical resolution of approximately 1-2 μm.

Further techniques available to create high-resolution images of surface topologies that can be used in Step S1 include, but are not limited to, shade-by-shading, interferometric measurements, confocal microscopy, or structured illumination.

Surface Sampling (Step S1a)

The inspected coated surface areas are much larger than the high-resolution imaged area (approx. 225 mm²). Therefore, several samples are taken to quantify the defects of a surface (see below) and attribute the individual samples with the human assessment metric.

Image Preprocessing (Step S2)

To ensure high and constant quality images, a median image subtraction method is performed to limit image acquisition device specific characteristics. For coating surfaces with low frequency spatial noise (e. g. structured wall surface, as determined in step S1), furthermore difference of Gaussian (DoG) is applied as a high-pass filter. Finally, images are normalized to have zero mean and unit variance.

When deep learning approaches are taken, preprocessing based on image statistics can usually be left out. However, in this case, it can optionally be used to ensure rather constant image quality and to notify (and understand) if image statistics indicate major changes in the nature of the imaged surface, leading to Imaging Model R1.

Semantic Defect Classification Algorithm ("Training" Branch in FIG. 3)

Creating a Training Data Set (Step S3)

In the initial embodiment, a training data set of 56 lab-prepared samples is created across four different application domains (architectural, wood, automotive, industrial coatings), using Steps S1, S1a, and S2. Domain experts classify the quality of the samples (metrics from 1 to 5, with 1=good and 5=bad, are applied). For each of the samples, several non-overlapping measurements are obtained, resulting in a total of 672 measurements. Pixel-wise labeling of the two different defect types considered here (pinholes and blisters) are performed by the domain experts as well.

Training the Classification Algorithm (Step S4)

In modern digital image processing, convolutional neural networks (CNN) are used in many tasks, including semantic segmentation. More specifically, the U-Net architecture is used in this embodiment, originally proposed by Ronneberger et al. (see above) for biomedical image segmentation.

Advantages of this architecture are that it works with relatively few training samples and has strong image augmentation. Due to its fully convolutional nature, it can work with arbitrarily large input images.

The network structure employed in this embodiment deviates from the originally proposed U-Net structure by scaling the images with a factor of 0.5, reducing the feature dimensions for the initial embodiment by 50%, which results in a feature space size of 512 at the bottom layer. No further data augmentation is applied.

In Step S4, the network is trained with standard stochastic gradient descent and a learning rate of 0.01. The loss function is the dice coefficient. For training and testing, an 80/20 split of the data sample level is used.

Defect Model (R2)

This results in a trained algorithm that is able to detect segmentation masks for the different types of defects (Defect Model R2). Based on this defect model, quantitative features are derived such as the number of detected defects, the percentage of the surface area affected by defects, the size distributions of the defects, the uniformity of spatial distributions across samples and measurements, etc.

Automatic Representation of Human Impression Metric (Step S5)

Based on the segmentation masks derived with the classification approach, a support vector machine algorithm is used to learn the human impression metric (Step S5).

Quality Model (R3)

Features are the metrics obtained by the semantic classification. Typical data processing is performed such as feature normalization. This results in a trained algorithm (R3) to predict human impression (surface quality) based on segmentation masks (R2).

Instead of the pair of a CNN for the segmentation and a support vector machine algorithm for learning the human impression metric, also a single classical CNN can be employed, where classical refers to a standard architecture of a couple of convolutional layers to extract features, followed by two fully connected layers with the last layer only containing one single neuron for the regression output.

This approach is an alternative to Steps S4 and S5, directly predicting human impression without segmentation masks and features, i. e. omitting Defect Model R2. This directly results in the predicted metric for a given image and shows similar results as in the two-step approach.

The advantage of separating the semantic pixel-based classification and the metric estimation (Steps S4 and S5) is interpretability, and it is very transparent to also included features for a sample across different measurements.

Testing Novel Images ("Evaluation Process" Branch in FIG. 3)

When a novel image has been acquired in Steps S1, S1a, and S2 (with the same image acquisition method and/or device type as in the "Training" branch), it is first tested whether the image meets imaging model criteria to detect whether the expected quality of subsequent results is sufficient (Step S6). Subsequently, defects are detected and quantified (Step S7) based on the Defect Model R2.

Optionally, the quality can be assessed (Step S8) by comparing the result against the Quality Model R3.

Moreover, the user can evaluate the quantitative and qualitative results, optionally feeding adjustments back to the database described above.

Figure 4:
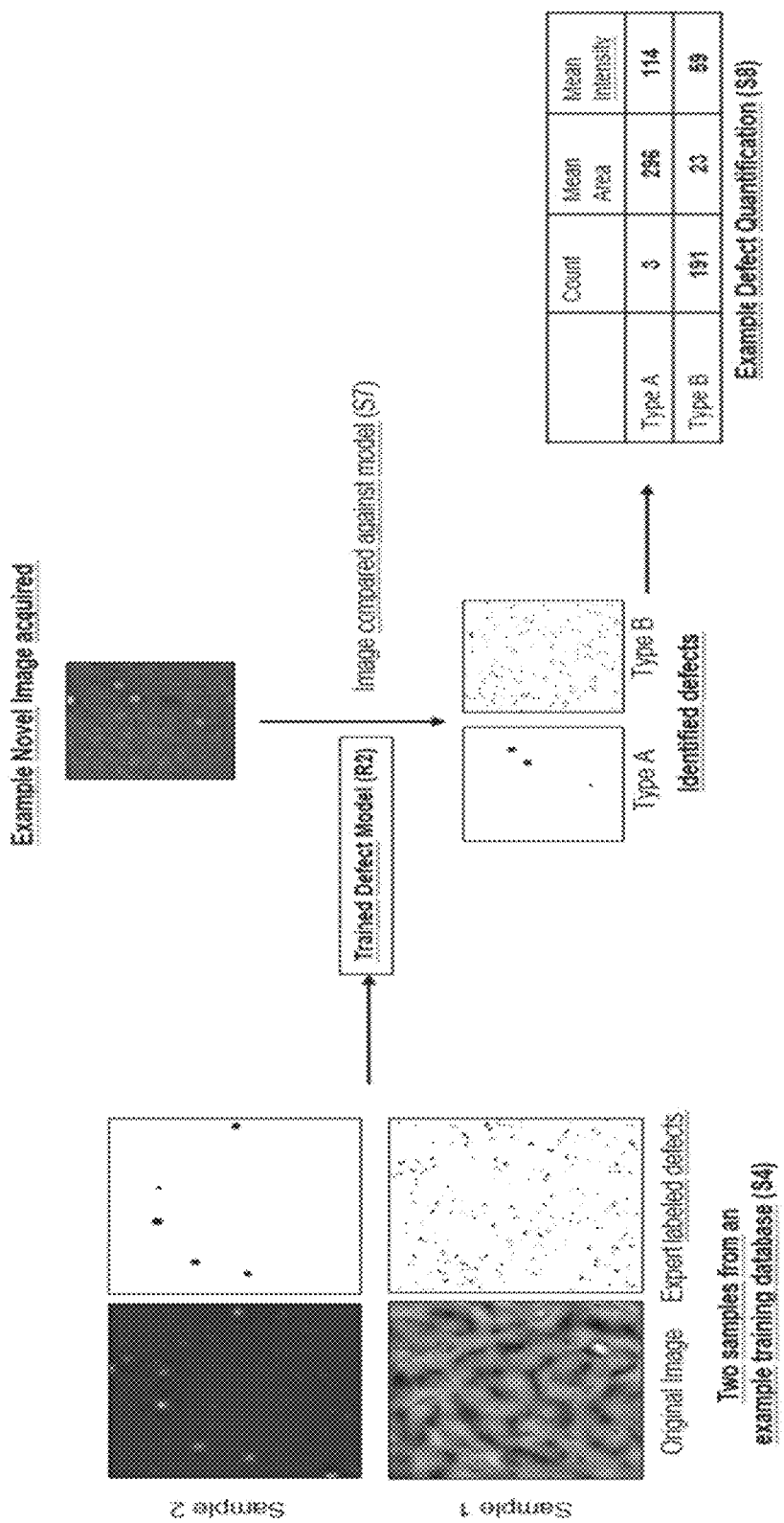
FIG. 4 shows another exemplary representation of the method for assessing a coated surface according to the fourth aspect of the invention.

FIG. 4 shows another exemplary representation of the method for assessing a coated surface according to the fourth aspect of the invention, i. e. an example of segmentation results, in more detail.

Two samples ("Sample 1", "Sample 2") from an example training database created in step S4 are shown (left part of FIG. 4), the left image of each sample showing the original image and the right image showing the corresponding positions of the expert labeled defects. In this case, simple defect types ("Type A", "Type B") are used (here: holes and bubbles).

Based on these training samples, a Trained Defect Model (R2) is generated.

When a novel image is acquired, it is compared against the trained model (step S7), and likely defective areas and their likely types (as existing in the training set) are detected (middle part of FIG. 4).

The identified defects can subsequently be quantified with a variety of blob based metrics (step S8), e. g. counts, areas, or intensities (right part of FIG. 4).

The invention claimed is:

1. A method for creating a training database for training a machine learning algorithm to recognize at least one type of coating surface defect that can occur on the coating surface, wherein the at least one type of coating surface defect includes at least one of pinhole, blister, crater, and seed, the method including:
obtaining a plurality of images of coated surfaces, wherein at least one image of the plurality of images is a three-dimensional image captured by a 3-dimensional scanner and including topography information of a coated surface of the coated surfaces;
generating a plurality of datasets each containing the at least one image of the plurality of images of the coated surfaces, wherein each dataset containing the at least one image of the plurality of images depicts the at least one type of coating surface defect and is labeled with the at least one type of coating surface defect and with quantitative and/or qualitative information about the depiction of the at least one type of coating surface defect in the at least one image, and wherein the three-dimensional image including the topography information of the coated surface provides details about a shape of the at least one type of coating surface defect,
storing the plurality of datasets in the training database,
training, using the plurality of datasets in the database, a computing device configured to execute a machine learning algorithm to create a trained machine learning algorithm, wherein the trained machine learning algorithm is trained to process a new image of a coating surface containing a defect and to recognize the at least one type of coating surface defect in the new image and to provide quantitative and/or qualitative information about the depiction of the at least one type of coating surface defect recognized by the trained machine learning algorithm in the new image.

2. The method according to claim 1, including generating said plurality of images of coated surfaces.

3. A system for assessing a coated surface with respect to a type set containing at least one type of coating surface defect that can occur on the coating surface, wherein the type set includes one or more of a pinhole, a blister, a crater, and a seed, the system comprising:
a scanner for capturing a new image of a coated surface, and
a computing device configured to execute at least one trained machine learning algorithm trained with a plurality of datasets in a database, the plurality of datasets in the database each containing at least one image of a coated surface, wherein each dataset containing the at least one image depicting the at least one type of coating surface defect is labeled with the at least one type of coating surface defect and with quantitative and/or qualitative information about the depiction of the at least one type of coating surface defect in the at least one image, and wherein the database includes a three-dimensional image including topography information of the coated surface that provides details about a shape of the at least one type of coating surface defect,
wherein the at least one trained machine learning algorithm is trained to process the new image captured by the scanner and to recognize the at least one type of coating surface defect in the new image captured by the scanner and to provide quantitative and/or qualitative information about the depiction of the at least one type of coating surface defect recognized by the trained machine learning algorithm in the new image captured by the scanner.

4. The system of claim 3, the scanner and computing device being incorporated into a single device.

5. The system of claim 3, the scanner and computing device being in communication over a network.

6. The system of claim 3, wherein each dataset is labeled with at least qualitative information about the depiction of the at least one type of coating surface defect in the at least one image.

7. The system according to claim 3, wherein the at least one trained machine learning algorithm contains a first machine learning algorithm, which uses a convolutional neural network to recognize the at least one type of coating surface defect in the new image.

8. The system according to claim 7, wherein the processing is conducted in accordance with a second machine learning algorithm, which uses a support vector machine algorithm to provide, based on a recognition result of the first machine learning algorithm, the quantitative and/or qualitative information about the depiction of the at least one coating surface defect in the new image.

9. The system according to claim 8, wherein the quantitative and/or qualitative information is a human impression metric.

10. The system according to claim 8, wherein the at least one trained machine learning algorithm uses a convolutional neural network with several layers to provide the quantitative and/or qualitative information about the depiction of the at least one type of coating surface defect in the new image, without having separately recognized the at least one type of coating surface defect in the new image before.

11. A method for assessing a coated surface with respect to a type set containing at least one type of coating surface defect that can occur on the coated surface, wherein the type set includes one or more of a pinhole, a blister, a crater, and a seed, the method comprising:
capturing, by a scanner, a new image of the coated surface, wherein the new image is a three-dimensional image including topography information of the coated surface, and
processing the new image using a computing device configured to execute at least one trained machine learning algorithm trained with a plurality of datasets in a database, the plurality of datasets in the database each containing at least one image of a coated surface, wherein each dataset containing the at least one image depicting the at least one type of coating surface defect is labeled with the at least one type of coating surface defect and with quantitative and/or qualitative information about the depiction of the at least one type of coating surface defect in the at least one image, and wherein the database includes a three-dimensional image including topography information of the coated surface that provides details about a shape of the at least one type of coating surface defect, wherein, during the processing of the new image by the at least one trained machine learning algorithm, the at least one trained machine learning algorithm is configured to assess the coated surface depicted in the new image and output information that the new image depicts the at least one type of coating surface defect and output quantitative and/or qualitative information about the depiction of the at least one type of coating surface defect in the new image.

12. The method for assessing a coated surface according to claim 11, wherein the capturing, by the scanner, of the new image comprises one or more of image acquisition, surface sampling, and image processing.

13. A method for assessing a coated surface with respect to a type set containing at least one type of coating surface defect that can occur on the coated surface, wherein the type set includes one or more of a pinhole, a blister, a crater, and a seed, the method comprising:

capturing, by a scanner, a new image of the coated surface wherein the new image is a three-dimensional image including topography information of the coated surface, and querying a computing device to obtain an assessment of the coated surface in the new image, the computing device configured to process the new image using at least one trained machine learning algorithm trained with a plurality of datasets in a database, the plurality of datasets in the database each containing at least one image of a coated surface, wherein each dataset containing the at least one image depicting the at least one type of coating surface defect is labeled with the at least one type of coating surface defect and with quantitative and/or qualitative information about the depiction of the at least one type of coating surface defect in the at least one image, and wherein the database includes a three-dimensional image including topography information of the coated surface that provides details about a shape of the at least one type of coating surface defect, during the processing of the new image by the computing device using the at least one trained machine learning algorithm, assessing, by the at least one trained machine learning algorithm, the coated surface depicted in the new image, and outputting information that the depicts the at least one type of coating surface defect and outputting quantitative and/or qualitative information about the depiction of the at least one type of coating surface defect in the new image.

14. The method for assessing a coated surface according to claim 13, wherein the at least one trained machine learning algorithm contains a first machine learning algorithm, which uses a convolutional neural network to recognize the at least one type of coating surface defect in the new image.

15. The method for assessing a coated surface according to claim 14, wherein the processing is conducted in accordance with a second machine learning algorithm which uses a support vector machine algorithm to provide, based on a recognition result of the first machine learning algorithm, the quantitative and/or qualitative information about the depiction of the at least one coating surface defect in the new image.

16. The method for assessing a coated surface according to claim 15, wherein the quantitative and/or qualitative information is a human impression metric.

17. The method for assessing a coated surface according to claim 13, wherein the at least one trained machine learning algorithm uses a convolutional neural network with several layers to provide the quantitative and/or qualitative information about the depiction of the at least one type of coating surface defect in the new image, without having separately recognized the at least one type of coating surface defect in the new image before.

18. The method according to claim 13, the scanner and computing device being incorporated into a single device.

19. The method according to claim 13, including querying the computing device over a network.

20. The method according to claim 13, wherein each dataset is labeled with at least qualitative information about the depiction of the at least one type of coating surface defect in the at least one image.

* * * * *